United States Patent
Wisnia et al.

(10) Patent No.: US 6,924,728 B2
(45) Date of Patent: Aug. 2, 2005

(54) SAFETY FEATURE FOR VEHICLES PARKED INDOORS

(75) Inventors: Jack Wisnia, Dollard des Ormeaux (CA); Robert Nelson, Hampstead (CA)

(73) Assignee: No-Start Inc., Quebec (CA)

(*) Notice: Subject to any disclaimer, the term of this patent is extended or adjusted under 35 U.S.C. 154(b) by 186 days.

(21) Appl. No.: 10/143,839

(22) Filed: May 14, 2002

(65) Prior Publication Data

US 2003/0027548 A1 Feb. 6, 2003

(30) Foreign Application Priority Data

May 14, 2001 (CA) .............................................. 2347471

(51) Int. Cl.⁷ ........................... G05B 19/00; G06F 7/04; B60R 25/10
(52) U.S. Cl. ............................... 340/5.31; 340/426.16; 340/426.17
(58) Field of Search ......................... 340/5.31, 426.16, 340/426.17

(56) References Cited

U.S. PATENT DOCUMENTS

| 2,543,789 | A | * | 3/1951 | MacMillan | 318/16 |
| 3,818,442 | A | * | 6/1974 | Solomon | 714/781 |
| 5,024,186 | A | * | 6/1991 | Long et al. | 123/179.4 |
| 5,519,255 | A | * | 5/1996 | Burtch et al. | 307/10.2 |
| 5,838,255 | A | * | 11/1998 | Di Croce | 340/825.69 |
| 5,942,988 | A | * | 8/1999 | Snyder et al. | 340/825.69 |
| 6,067,028 | A | * | 5/2000 | Takamatsu | 340/5.8 |

* cited by examiner

*Primary Examiner*—Michael Horabik
*Assistant Examiner*—Kimberly Jenkins
(74) *Attorney, Agent, or Firm*—McDermott Will & Emery LLP

(57) ABSTRACT

The vehicle safety system which is for a vehicle equipped with a remote starter comprises a wireless transmitter located inside a closed space, adapted to emit a signal for disabling the remote starter. The system further comprises at least one wireless receiver located on board the vehicle, and being operatively connected to the remote starter. The wireless receiver, upon receipt of the signal, disables the remote starter, and thereby prevents remote starting of the vehicle.

6 Claims, 2 Drawing Sheets

SAFETY FEATURE FOR VEHICLES PARKED INDOORS

FIELD OF THE INVENTION

The present invention relates to a safety feature for vehicles parked indoors.

DESCRIPTION OF THE PRIOR ART

Vehicle remote starters are widely used, particularly in colder climates. Typically, as is well known in the art, these systems will consist of a wireless transmitter held and operated by a user, and a wireless receiver, operatively connected to a starter system within the vehicle. When a signal of the proper frequency (and code) is received by the wireless receiver, the engine's ignition is enabled (in the case of a diesel engine, the engine's glow-plugs are lit), and the starter solenoid is energized, thereby causing the engine to start.

As is also well known, these systems entail safety considerations. The most important safety consideration is to prevent the engine from being remotely started should a person be working on the engine. Accordingly, a hood interlock is always used, so that if the hood of the vehicle is raised, the system is prevented from remotely starting the vehicle. In typical situations, a ground is applied to the hood pin switch.

Another safety consideration is that the vehicle should be prevented from starting if the vehicle is in an enclosed space, where the exhaust from the engine can cause potentially fatal CO levels.

SUMMARY OF THE INVENTION

It is an object of the invention to automatically prevent accidental or unauthorized triggering of a remote vehicle starting system, specifically for a vehicle parked in an enclosed space such as a garage, to avoid possible carbon monoxide saturation hazards.

In accordance with the invention, this object is achieved with a safety device for indoor parked vehicles, comprising a wireless transmitter device, located inside a closed space, and a wireless receiver device, located on board the vehicle and operatively connected to the remote vehicle starter system. In a preferred embodiment of the invention, the wireless transmitter and the wireless receiver are IR (infrared) devices. The IR transmitter is used to automatically disable the remote vehicle starter system when the vehicle is located in proximity to the IR device.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1:
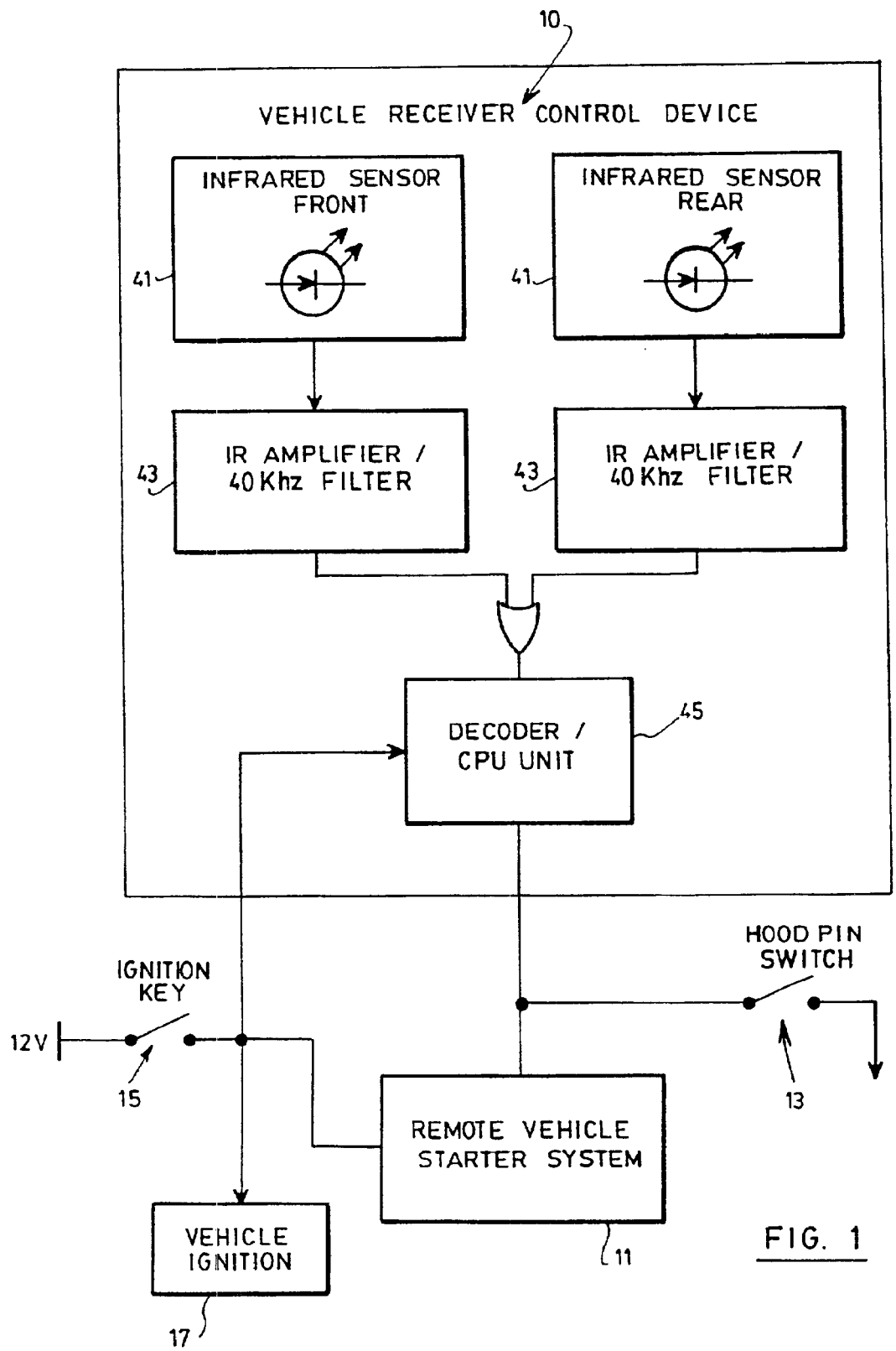
FIG. 1 is a block diagram of the IR receiver control device.
Figure 2:
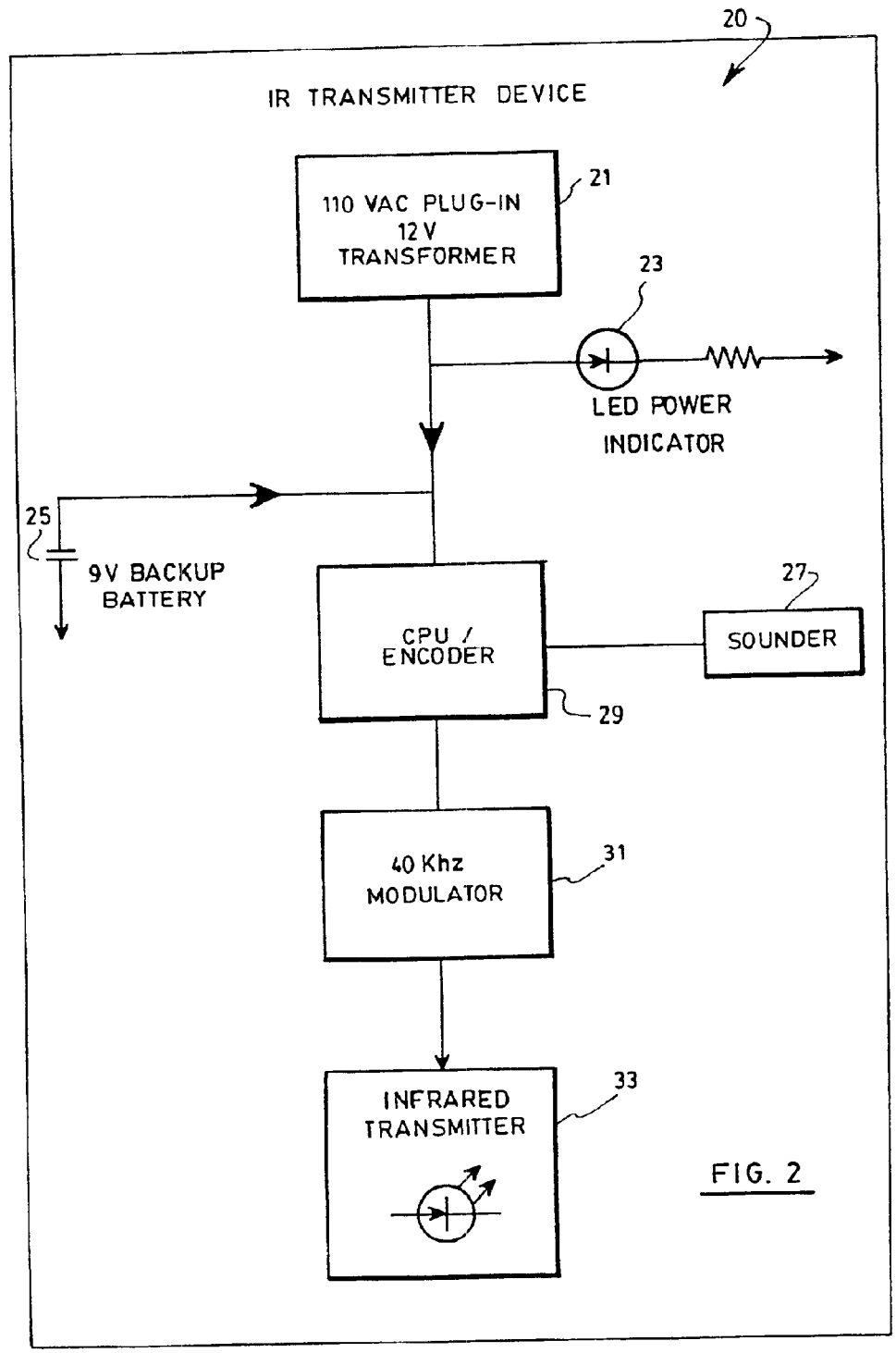
FIG. 2 is a block diagram of the IR transmitter control device.

Referring now to the accompanying figures, the present invention is a safety device for indoor parked vehicles, comprising a wireless transmitter device 20, located inside a closed space, and at least one wireless receiver device 10, located on board the vehicle and operatively connected to the remote vehicle starter system 11.The remote vehicle starter system II is in turn connected to the vehicle ignition 17.In a preferred embodiment of the invention, the wireless transmitter 20 and the wireless receiver 10 are IR (infrared) devices. The JR transmitter 20 is used to automatically disable the remote vehicle starter system 11 when the vehicle is located in proximity to the JR transmitter 20.

According to a preferred embodiment of the invention, the IR transmitter 20 constantly transmits a disabling code at predetermined time intervals. The code, when received by the IR receiver 10, places the remote vehicle starter system in Parked Indoor Mode. In a preferred embodiment of the invention, a single valid disabling code is required to place the vehicle in Parked Indoor Mode, in which state the IR receiver sends a signal to the remote vehicle starter system to prevent undesired activation of the system. Usually, as mentioned above, remote vehicle starter systems are provided with a safety hood pin switch 13, which disables the system when the vehicle is being serviced (i.e. when the hood is raised). This hood pin switch 13 essentially applies a ground signal to the remote vehicle starter system 11, preventing remote starting of the vehicle. For this reason, applying a ground to the hood pin switch 13 is a preferred means of disabling the remote vehicle starter system according to the present invention. It should be noted that the Parked Indoor Mode state is disabled when the user manually starts the engine by placing the key in the ignition 15.

The IR transmitter 20 is powered from a plug-in AC power transformer 21. It is operatively connected to a LED 23 for indicating power on, and uses a back-up battery 25 with a sounder (or any other alarm) 27, to indicate power failure.

The code format of the signal sent by the transmitter insures that latching the security device into Parked Indoor Mode can be achieved only by the appropriate transmitter, and not by any other IR device. Thus, in a preferred embodiment of the invention, a fixed, 24-bit message is sent three times in sequence. The specific carrier frequency using amplitude modulation (AM) for the IR transmission is selected to be 40 KHz. The code is preferably sent every minute.

To that effect, the transmitter includes an encoder 29 and a modulator 31 for encoding and modulating the signal, and then emitting it with the emitter 33.

However, it should be understood that other ways of encoding the signal fall within the scope of the present invention.

The security system according to the present invention includes at least one, but preferably two (one for the front and one for the back of the vehicle) IR receivers, but only one transmitter but in line-of-sight with at least one of the receivers. The receivers on board the vehicle are powered by the main vehicle battery.

The receiver 10 includes two IR sensors 41, each connected to an IR amplifier and filter 43 (could be one unit or two separate units) whose outputs are combined and input into a decoder 45. The decoder, when the correct code has been received, disables the remote vehicle starter system 11 by closing hood pin switch 13, thereby grounding the latter. In order to start the vehicle, the decoder 45 also monitors the ignition key, and opens hood pin switch when the key is inserted into the ignition.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A vehicle safety system for a vehicle equipped with a remote starter, said system comprising:
   a wireless transmitter located inside a closed space and fixedly secured thereto, said transmitter emitting a signal for automatically disabling said remote starter when said vehicle is in said closed space; and
   at least one wireless receiver located on board said vehicle, and being operatively connected to said remote starter, said wireless receiver, upon receipt of said signal, disabling said remote starter thereby preventing remote starting of said vehicle.

2. A vehicle safety system according to claim 1, wherein said closed space is a car garage.

3. A vehicle safety system according to claim 1, wherein said wireless transmitter is an IR transmitter, and said at least one receiver is an IR receiver, and wherein when said vehicle is located inside said closed space, said transmitter and at least one of said at least one receiver are in line-of-sight alignment.

4. A vehicle safety system according to claim 1, wherein said vehicle includes two transmitters located at a front and at a back of said vehicle.

5. A vehicle safety system according to claim 1, wherein said transmitter emits said signal regularly or sporadically.

6. A vehicle system for a vehicle equipped with a remote starter, said system comprising:
   a wireless transmitter located inside a closed space, said transmitter being adapted to emit a signal for disabling said remote starter; and
   at least one wireless receiver located on board said vehicle, and being operatively connected to said remote starter, said wireless receiver, upon receipt of said signal, disabling said remote starter thereby preventing remote starting of said vehicle,
   wherein said signal is a 24-bit message sent three times in sequence.

* * * * *